United States Patent
Kanazawa

(10) Patent No.: US 7,149,371 B2
(45) Date of Patent: Dec. 12, 2006

(54) IMAGE FILING APPARATUS

(75) Inventor: Toshiya Kanazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 915 days.

(21) Appl. No.: 08/774,012

(22) Filed: Dec. 26, 1996

(65) Prior Publication Data

US 2002/0057463 A1 May 16, 2002

(30) Foreign Application Priority Data

Dec. 26, 1995 (JP) .................................. 7-338960

(51) Int. Cl.
*G06K 9/54* (2006.01)
(52) U.S. Cl. ..................... 382/306; 358/1.14; 358/1.17; 358/437
(58) Field of Classification Search ................ 358/403, 358/437, 308, 1.13, 1.14, 1.15, 1.16, 1.17; 382/306; 395/115, 116, 114
See application file for complete search history.

(56) References Cited

U.S. PATENT DOCUMENTS

| | | | | |
|---|---|---|---|---|
| 4,466,065 A | * | 8/1984 | Advani et al. .............. 364/300 |
| 5,012,281 A | * | 4/1991 | Kusumoto et al. ............. 399/21 |
| 5,038,319 A | * | 8/1991 | Carter et al. .................... 714/2 |
| 5,073,827 A | * | 12/1991 | Nakajima .................... 358/437 |
| 5,103,318 A | * | 4/1992 | Takaoka ..................... 358/404 |
| 5,210,823 A | * | 5/1993 | Moroi ....................... 358/1.17 |
| 5,222,157 A | * | 6/1993 | Yoneda et al. ............. 382/306 |
| 5,255,986 A | * | 10/1993 | Koiwai ......................... 400/61 |
| 5,276,802 A | * | 1/1994 | Yamaguchi et al. ........ 395/164 |
| 5,450,571 A | * | 9/1995 | Rosekans et al. ........... 395/500 |
| 5,529,406 A | * | 6/1996 | Ueda et al. ................... 400/76 |
| 5,715,381 A | * | 2/1998 | Hamilton .................... 395/114 |
| 5,718,520 A | * | 2/1998 | MacKay ....................... 400/61 |
| 5,761,396 A | * | 6/1998 | Austin et al. ............... 395/114 |
| 5,771,380 A | * | 6/1998 | Tanaka et al. .............. 345/129 |
| 2002/0057463 A1 | * | 5/2002 | Kanazawa .................. 358/437 |

* cited by examiner

*Primary Examiner*—Gregory Desire
(74) *Attorney, Agent, or Firm*—Fitzpatrick, Cella, Harper & Scinto

(57) ABSTRACT

An image filing apparatus prints a search (mark) sheet, on which the reduced image of the first page of a document stored on an optical magnetic disk is written, from a printer unit. When the printer unit cannot print the search sheet because no paper is available or the like, information indicating that the search sheet was not output is recorded on the magnetic optical disk is displayed on the operation screen of a touch panel display. A search sheet print key is also displayed on the operation screen. When the search sheet key is depressed, the not yet output search sheet is then printed.

20 Claims, 22 Drawing Sheets

IMAGE FILING APPARATUS

BACKGROUND OF THE INVENTION

1. Field of the Invention

The present invention relates to an image filing apparatus for storing an image to a storage medium.

2. Description of the Related Art

Conventionally, an image filing apparatus for storing and searching for image data manages the attributes of the image data of a read original, such as the reading resolution, reading size, reading gradation and the like thereof, as well as a plurality of image data together with the image data of the original as a group and further constructs a database by adding to them searching keywords such as document name, document number registered data and the like, and manages the database unitarily.

However, as to the store of the image of an original, the image is fetched by a scanner after a keyword as described above is input or a desired image is printed after a corresponding document is retrieved by inputting a keyword and the document is confirmed by being displayed on a display unit or the like in the operation of the image filing apparatus.

However, since a keyword which is to be used thereafter must be input when an image is stored in the above arrangement, there is the problem that operability is greatly restricted.

Further, when an input keyword is forgotten or its classification is ambiguous, since a desired document cannot be specified unless all the documents are displayed eventually, the problem arises in that the searching job is troublesome.

In addition, since a storing operation is completely different from a searching operation, there is also the problem that the operations are very difficult to understand and liable to become complex and the apparatus is liable to be occupied by only one operator.

To cope with the above problems, U.S. Pat. No. 5,222,157 and the like propose to simplify the searching operation in such a manner that search sheets corresponding to documents stored to a storage medium are created in a one to one relationship and output from a printer so that the searching operation is simplified by using the search sheet when an image is to be searched without the need of inputting a specific keyword when an image is stored.

However, when the search sheet cannot be output because papers are not available in a printer or because of other reasons after the completion of the store of an image, the apparatus is occupied by only one operator until papers are replenished and the output of the search sheet is completed. Further, when the output operation is stopped to release the occupation of the apparatus, there arises the problem that a search sheet corresponding to the stored document is not output.

SUMMARY OF THE INVENTION

Accordingly, it is an object of the present invention to provide an image filing apparatus and a method of controlling the image filing apparatus by which the aforesaid drawbacks can be removed.

It is another object of the present invention to provide an image filing apparatus and a method of controlling the apparatus capable of preventing the apparatus from being occupied for a prolonged period of time to thereby permit the apparatus to be shared.

It is still another object of the present invention to provide an image filing apparatus and a method of controlling the apparatus capable of preventing a search sheet from being left in a not printed state.

It is a further object of the present invention to provide an image filing apparatus and a method of controlling the apparatus capable of easily printing an not yet printed search sheet.

Other objects of the present invention will be apparent from the description based on accompanying drawings and claims.

DESCRIPTION OF THE PREFERRED EMBODIMENT

An embodiment of the present invention will be described below with reference to the drawings.

Figure 1:
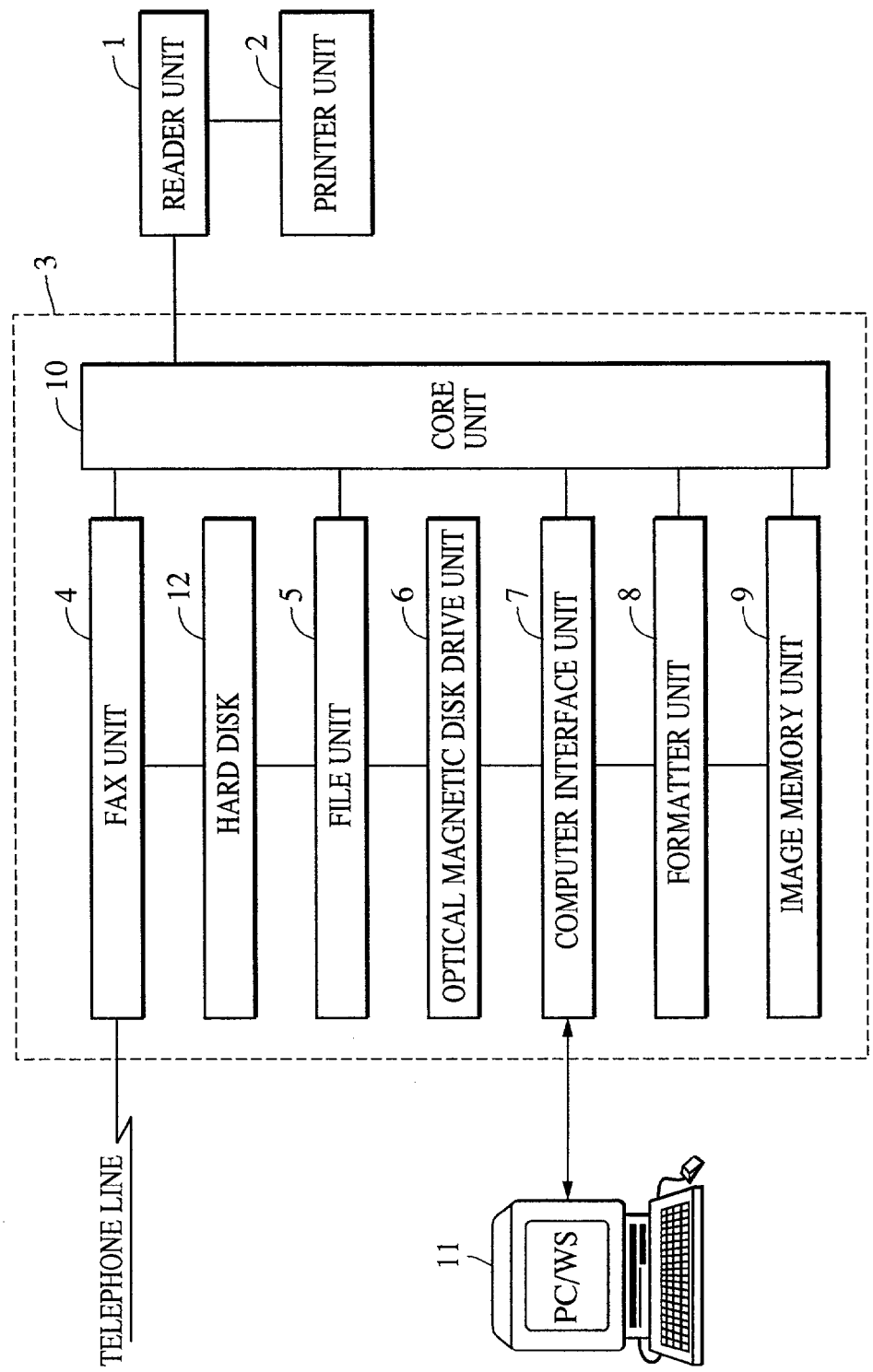
FIG. 1 is a block diagram of an image processing apparatus to which the present invention is applicable.

FIG. 1 is a block diagram showing the arrangement of an image processing apparatus to which the present invention is applicable. A reader unit 1 reads the image of an original and outputs image data according to the image of the original to a printer unit 2 and an image I/O controller 3. The printer unit 2 records an image according to the image data from the reader unit 1 and the image I/O controller 3 on a recording paper. The image I/O controller 3 is connected to the reader unit 1 and composed of a facsimile unit 4, a file unit 5, a computer interface unit 7, a formatter unit 8, an image memory unit 9, a core unit 10 and the like.

The facsimile unit 4 expands compressed image data received through a telephone line and transfers the expanded image data to the core unit 10 as well as compresses image data transferred from the core unit 10 and transfers the compressed image data through the telephone line. A hard disk 12 is connected to the facsimile unit 4 and can temporarily store received compressed image data. An optical magnetic disk drive unit 6 is connected to the file unit 5 which compresses image data transferred from the core unit 10 and causes an optical magnetic disk set to the optical magnetic disk drive unit to store the compressed image data together with a keyword for searching the image data. The file unit 5 searches the compressed image data stored to the optical magnetic disk based on the keyword transferred through the core 10, reads out and expands the searched compressed image data and transfers the expanded image data to the core unit 10. The computer interface unit 7 is an interface between a personal computer or a work station (PC/WS) 11 and the core unit 10. The formatter unit 8 is used to develop code data representing the image transferred from the PC/WS 11 to image data which can be recorded by the printer unit 2, and the image memory unit 9 is used to temporarily store data transferred from the PC/WS 11. Although the core unit 10 will be described later, it controls the flow of data between each of the reader unit 1, the facsimile unit 4, the file unit 5, the computer interface unit 7, the formatter unit 8, and the image memory unit 9.

An image filing apparatus is composed of the reader unit 1, the printer unit 2, the file unit 5, the optical magnetic disk drive unit 6 and the core unit 10.

Figure 2:
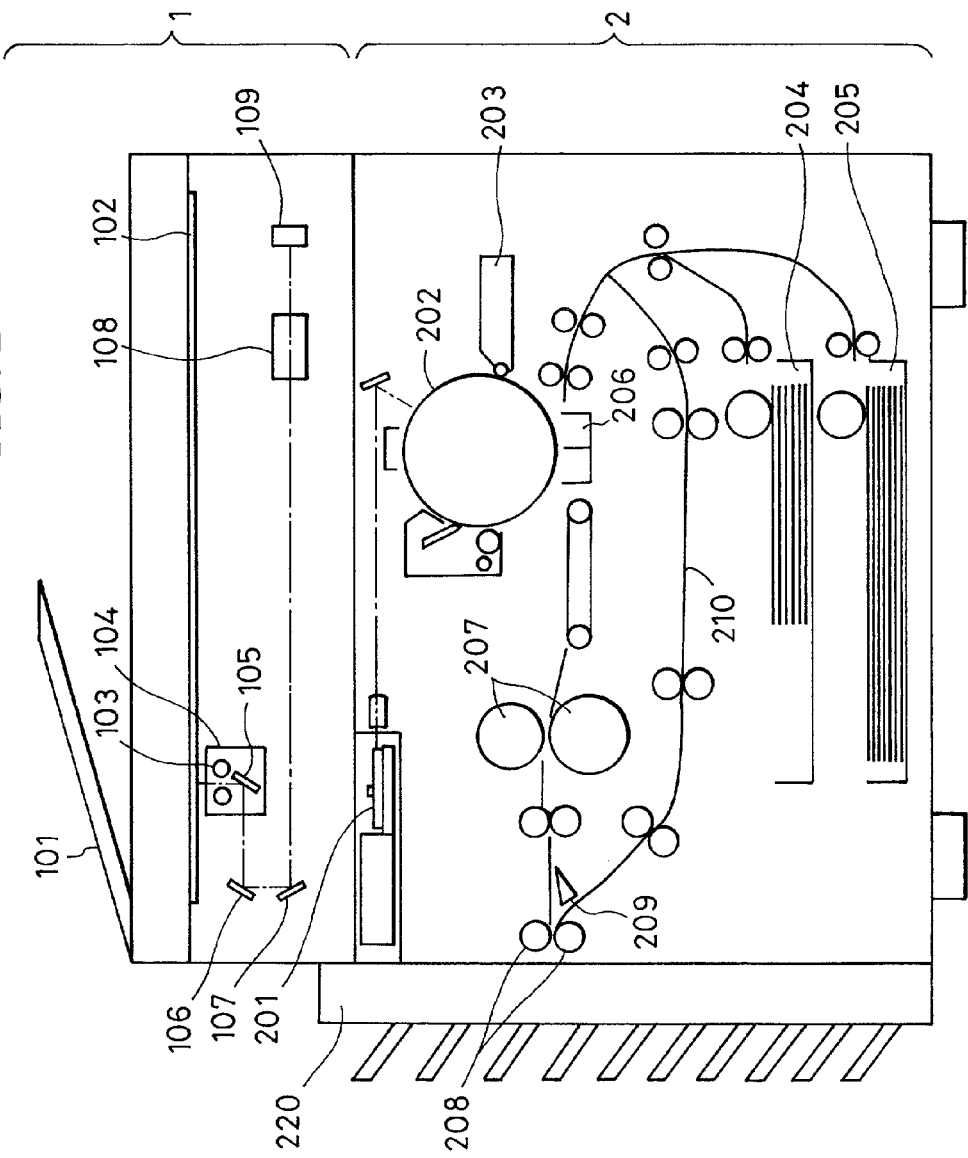
FIG. 2 is a cross sectional view of a reader unit and a printer unit.

FIG. 2 is a cross sectional view of the reader unit 1 and the printer unit 2.

The original feeder 101 of the reader unit 1 sequentially feeds originals onto a platen glass 102 from the last page thereof one by one and discharges the originals on the platen glass 102 after they are read. When the originals are fed onto the platen glass 102, a lamp 103 is put on and a scanner unit 104 starts to move to expose and scan the originals. Light reflected from the original at the time is introduced to a CCD image sensor (hereinafter, referred to as a CCD) 109 by mirrors 105, 106, 107 and a lens 108. As described above, the image of the scanned original is read by the CCD 109 and the image data output from the CCD 109 is transferred to the printer unit 2 and the core unit 10 of the image I/O controller 3 after it is subjected to predetermined processings.

The laser driver 221 of the printer unit 2 drives a laser beam emitter 201 and causes the laser beam emitter 201 to emit a laser beam according to the image data output from the reader unit 1. The laser beam is irradiated onto a photoconductor drum 202 and a latent image according to the laser beam is formed to the photoconductor drum 202. A developing agent is adhered to the portion of the latent image on the photoconductor drum 202 by a developing unit 203. A recording paper is fed from either one of a cassette 204 and a cassette 205 at a timing in synchronism with the start of irradiation of the laser beam and transferred to a transfer unit 206 to thereby transfer the developing agent adhered to the photoconductor drum 202 to the recording paper. The recording paper to which the developing agent is transferred is transferred to a fixing unit 207 and the developing agent is fixed to the recording paper by the heat and pressure of the fixing unit 207. The recording paper having passed through the fixing unit 207 is discharged by a discharge roller 208 and a sorter 220 accommodates the discharged recording paper to each bin to sort it. Note, when sorting is not set to the sorter 220, it accommodates the discharged recording paper in the uppermost bin. Further, when both-side recording is set, the discharge roller 208 is rotated in a reverse direction after the recording paper is transferred to the discharge roller 208 to thereby introduce the recording paper to a paper re-feed transfer path by a flapper 209. When multiple-recording is set, the recording paper is introduced to the paper re-feed transfer path so that it is not transferred to the discharge roller 208. The recording paper introduced to the paper re-feed transfer path is fed to the transfer unit 206 at the aforesaid timing.

Figure 3:
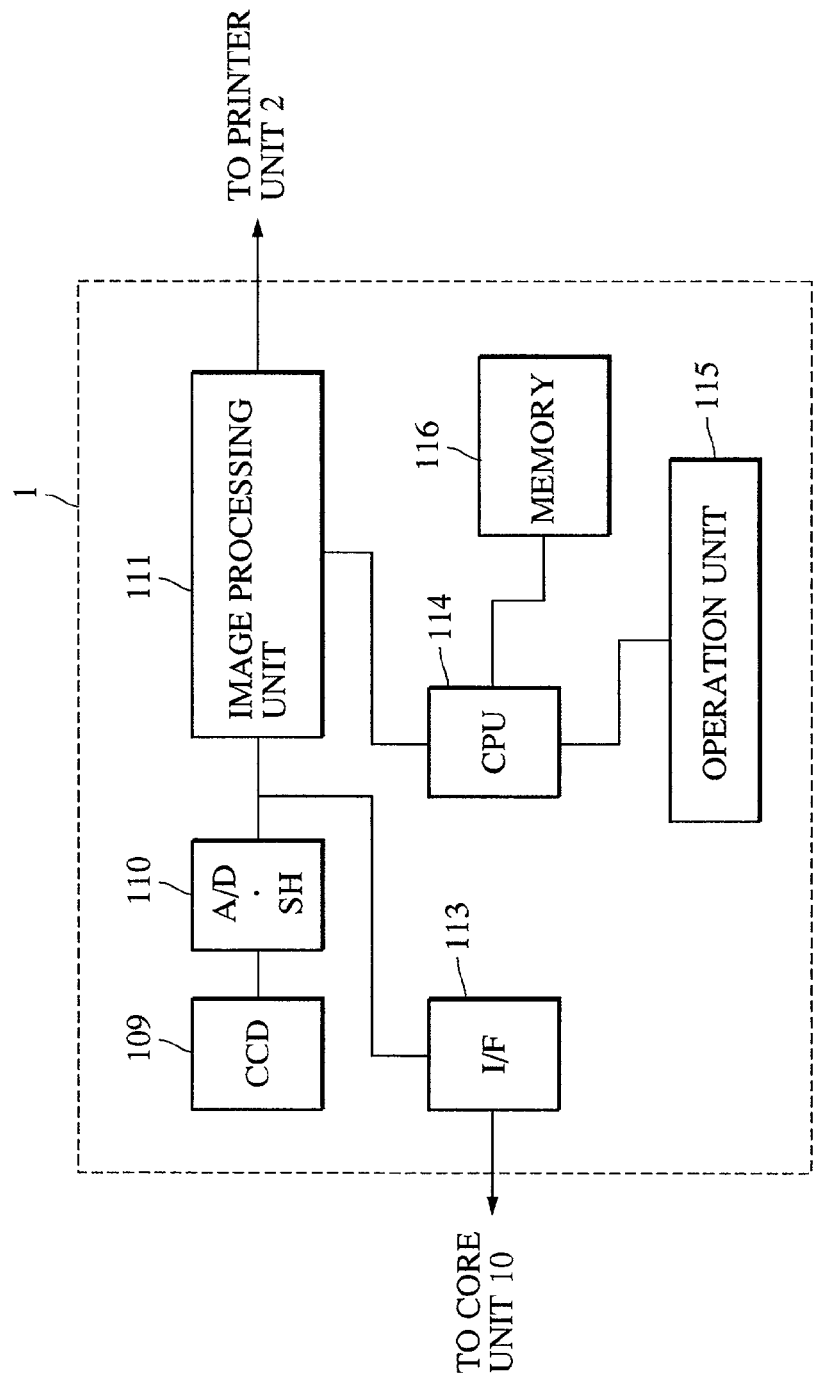
FIG. 3 is a block diagram of a reader unit.

FIG. 3 is a block diagram of the reader unit 1. The image data output from the CCD 109 is subjected to analog/digital conversion by A/D•SH unit 110 as well as subjected to shading correction. The image data processed by the A/D•SH unit 110 is transferred to the printer unit 2 through an image processing unit 111 as well as transferred to the core unit 10 of the image I/O controller 3 through an interface unit 113. A CPU 114 controls the image processing unit 111 and the interface unit 113 according to the set content set by an operation unit 115. When a copy mode for executing a trimming processing and then making copy is set by the operation unit 115, the image data is subjected to the trimming processing at the image processing unit 111 and transferred to the printer unit 2. Further, when a facsimile transmission mode is set by the operation unit 115, for example, the interface unit 113 transfers a control command according to the image data and the set mode to the core unit 10. The control program of the CPU 114 is stored to a memory 116 and the CPU 114 executes control while referring to the memory 116. The memory 116 is also used as a working region of the CPU 114. Note, the operation unit 115 includes a touch panel display composed of an LCD and a transparent touch key which are known well.

Figure 4:
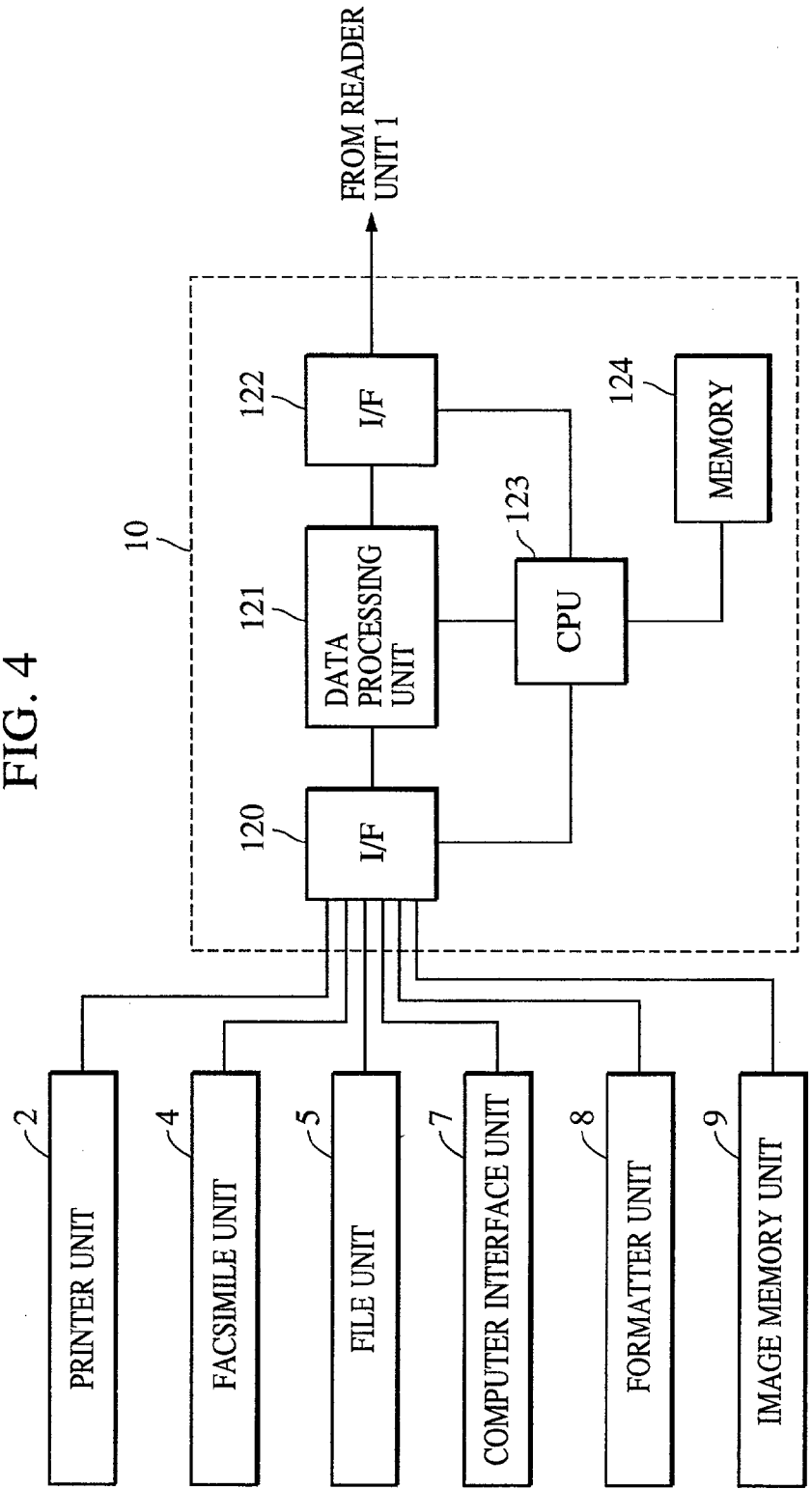
FIG. 4 is a block diagram of a core unit.

FIG. 4 is a block diagram of the core unit 10. Image data from the reader unit 1 is transferred to a data processing unit 121 and a control command from the reader unit 1 is transferred to a CPU 123. The data processing unit 121 executes image processings such as an image rotation processing, an image size changing processing and the like. The image data transferred from the reader unit 1 to the data processing unit 121 is transferred to the facsimile unit 4, the file unit 5 and the computer interface unit 7 through an interface 120 according to the control command transferred from the reader unit 1. Further, a code data representing an image input through the computer interface unit 7 is transferred to the data processing unit 121 and then to the formatter unit 8 where it is developed to image data which is transferred to the facsimile unit 4 and the printer unit 2 after it is transferred to the data processing unit 121. The image data from the facsimile unit 4 is transferred to the printer unit 2, the file unit 5 and the computer interface unit 7 after it is transferred to the data processing unit 121. Further, the image data from the file unit 5 is transferred to the printer unit 2, the facsimile unit 4 and the computer interface unit 7 after it is transferred to the data processing unit 121. A CPU 123 executes the above control according to the control program stored to a memory 124 and the control command transferred from the reader unit 1. The memory 124 is also used as a working region of the CPU 123. As described above, there can be executed a processing in which combined are functions such as reading of original image, printing of image, receiving and transmission of image, storing of image, data input and output from a computer and the like using the core 10 as a central unit of the processing. Description of File Unit 5

Figure 5:
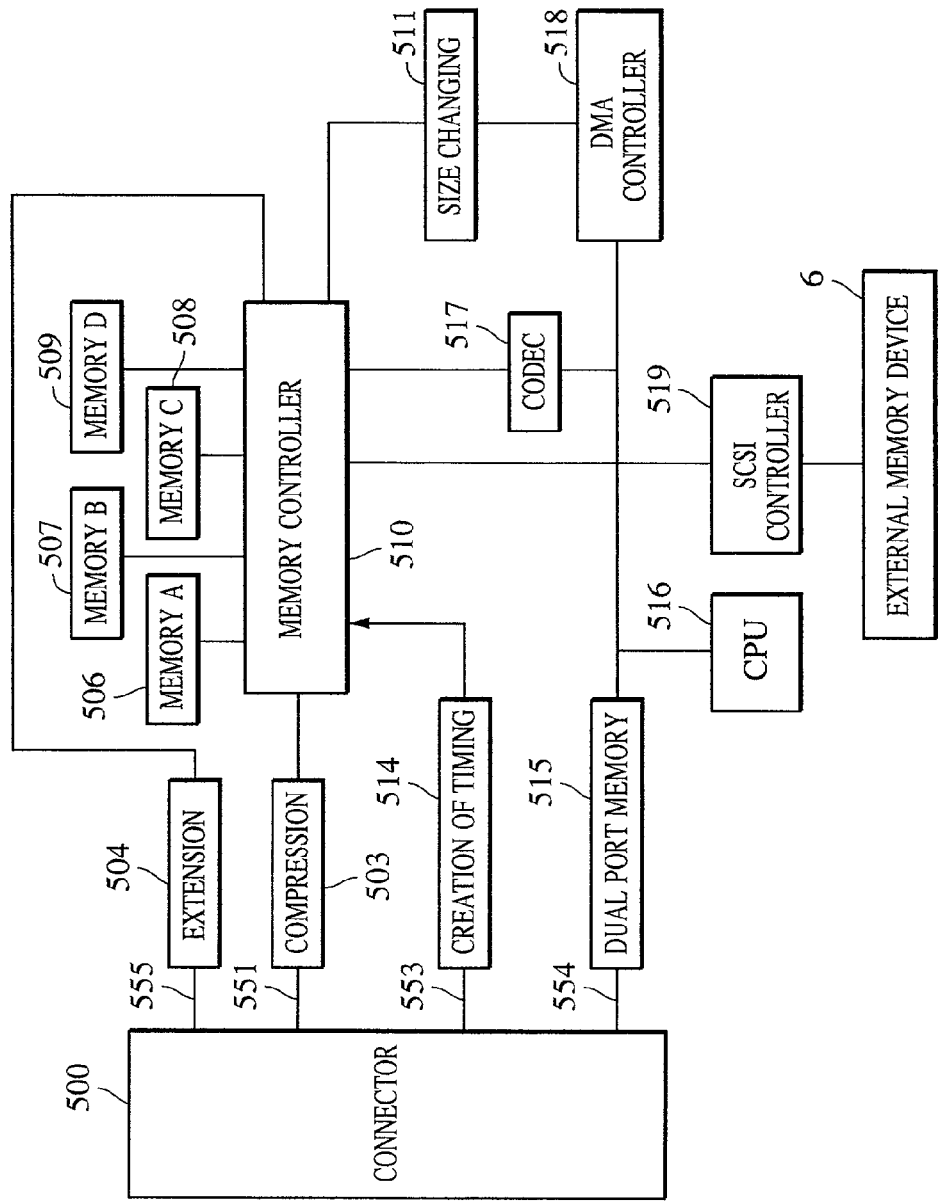
FIG. 5 is a block diagram of a file unit.

FIG. 5 is a block diagram showing the detailed arrangement of the file unit 5 and the arrangement and operation of the file unit 5 will be described using FIG. 5.

The file unit 5 is connected to the core unit 10 through a connector 500 and transfers and receives various signals. A multi-value image signal input through a signal line 551 is input to a compression circuit 503 and converted into compressed information there and then output to a memory controller 510. The compressed image signal compressed by the compression circuit 503 is stored to any one of a memory A506, a memory B507, a memory C508 and a memory D509 or by a memory in which two sets of the memories are cascade connected under the control of the memory controller 510. The memory controller 510 has a mode for transferring data to and receiving data from the memory A506, the memory B507, the memory C508 and the memory D509 and a CPU bus 560 in response to an instruction from a CPU 516, a mode for transferring data to and receiving data from a CODEC 517 which executes encoding and decoding, a mode for transferring the data of the content of the memory A506, the memory B507, the memory C508 and the memory D509 from a size changing circuit 511 to a bus 562 under the control of a DMA controller 518 and a mode for transferring data to and receiving data from the compression circuit 503 and an extension circuit 504 under the control a timing creation circuit 514.

The memory A506, the memory B507, the memory C508 and the memory D509 have a capacity of 2 Mbytes, respectively and store an image corresponding to an A4 size with a resolution of 400 dpi. The timing creation circuit 514 is connected to a signal line 553 through the connector 500, started in response to the control signal (HSYNC, HEN, VSYNC, VEN) from the core unit 10 and creates a signal for achieving the following two functions. The first of the two functions is a function for storing an image signal compressed by the compression circuit 503 to any one of the memory A506 to the memory D509 or two of them and the second of them is a function for reading out an image signal from any one of the memory A506 to the memory D509 and outputting it to the extension circuit 504. A dual port memory 515 is used to transfer a command between the CPU 1003 of the core unit 10 and the CPU 516 of the file unit 5. An SCSI controller 519 executes interface to the external storing unit 6. The external storing unit 6 is specifically composed of an optical magnetic disk 521 and accumulates data such as image information and the like. A CODEC 517 reads out image information stored to any of the memory A506 to the memory D509 and encodes it by a desired system of MH, MR and MMR systems and then stores it to any of the memory A506 to the file unit 509D as encoded information. Further, the CODEC 517 reads out encoded information stored to the memory A506 to the memory D509 and decodes it by a desired system of the MH, MR and MMR systems and then stores it to any of the memory A506 to the memory D509 as decoded information, i.e. image information.

A processing for accumulating image information to the external storing unit 6 will be described. A 8-bit multi-value image signal from the reader unit 1 is input from the connector 500 and to the compression circuit 503 through a signal line 551 and converted into accumulated information there. The accumulated information is input to the memory controller 510. The memory controller 510 stores the accumulated signal to the memory A506 in response to a timing signal created by a timing creation circuit 514 in response to the signal from the core unit 10. The CPU 516 outputs the data stored to the memory A506 to the CODEC 517 through the memory controller 510. The CODEC 517 encodes the data read out from the memory A506 by the MR method and the CPU 516 writes the encoded information to the memory B507 through the memory controller 510. When the CODEC 517 finishes the encoding operation, the CPU 516 sequentially reads out the encoded information stored to the memory B507 through the memory controller 510 and transfers it to the SCSI controller 519. The SCSI controller 519 causes the external storing unit 6 to store the encoded information.

Next, a processing for reading out the image information from the external storing unit 6 and outputs it to the printer unit 2 will be described. On receiving a command for searching and printing information, the CPU 516 transfers the encoded information from the external storing unit 6 to the memory C508 through the SCSI controller 519 and the memory controller 510. On the completion of the transfer of the encoded information to the memory C508, the CPU 516 causes the memory C508 to output the encoded information stored therein to the CODEC 517 through the memory controller 510. The CODEC 517 sequentially decodes the encoded information read out from the memory C508 and the CPU 516 transfers the decoded information to the memory D509 through the memory controller 510. When a size change such as enlargement, reduction and the like is needed in the process of outputting information to the printer 2, the decoded information stored to the memory D509 is output to the size changing circuit 511 through the memory controller 510, the size of the decoded information is changed under the control of the DMA controller 518 and the size-changed decoded information is stored to the memory D509 again. The CPU 516 communicates with the CPU 1003 of the core unit 10 through the dual port memory 515 to thereby make setting for outputting the decoded information stored to the memory D509 to the printer unit 2 through the core unit 10 as an image. On the completion of the setting, the CPU 516 starts the timing creation circuit 514 to cause it to output a predetermined timing signal to the memory controller 510. The memory controller 510 reads out the decoded information from the memory D509 in synchronism with the signal from the timing creation circuit 514 and outputs it to the extension circuit 504 to expand the information there. The image information expanded by the extension circuit 504 is output to the core unit 10 through the connector 500.

Next, a processing for storing and searching an image in the image filing apparatus according to the present invention will be described.

A searching mark sheet 1201 will be described below using FIG. 6.

Figure 6:
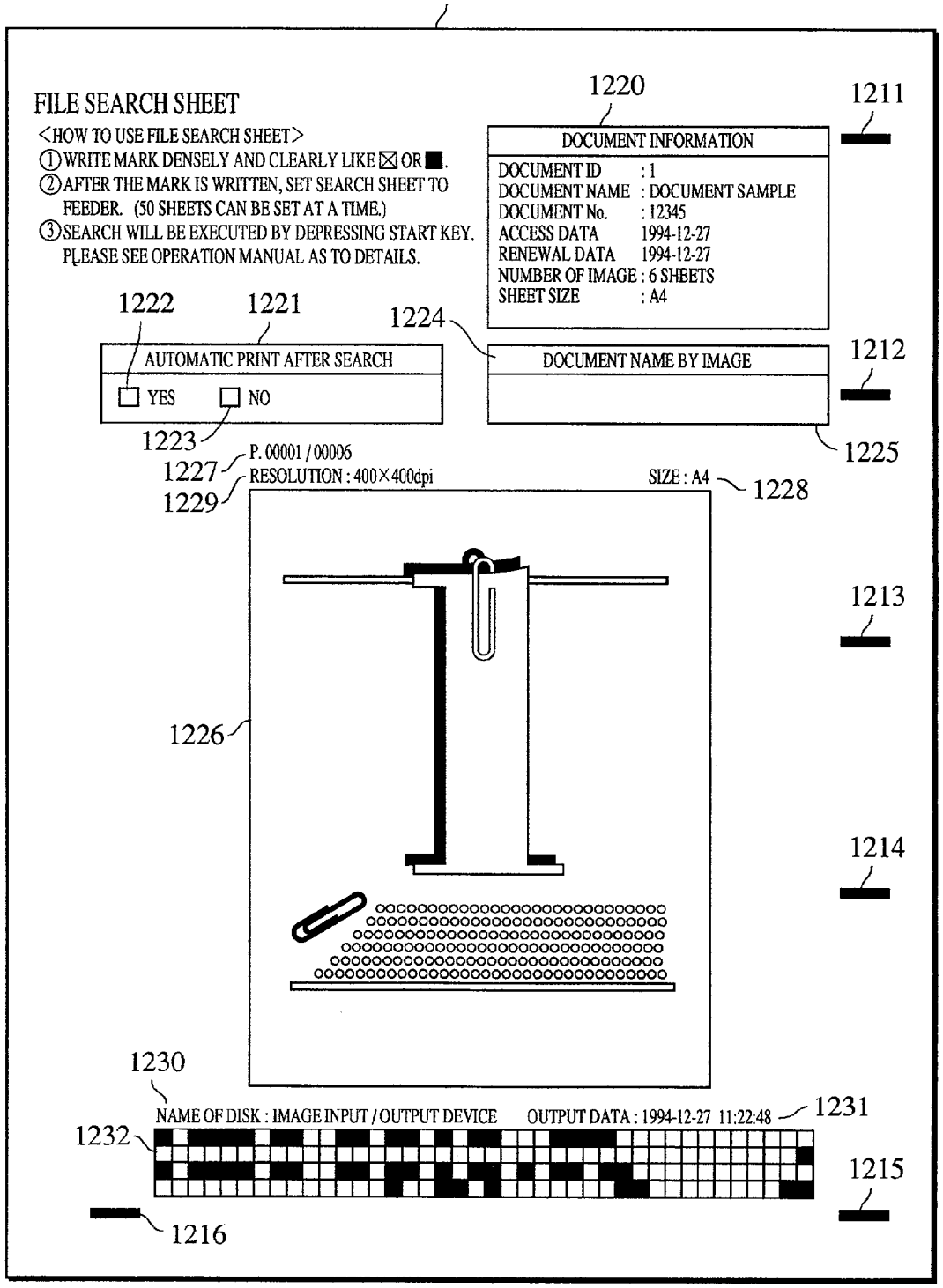
FIG. 6 is a view showing a search sheet.

FIG. 6 shows the format of the searching mark sheet 1201 (hereinafter, referred to as a search sheet) in the file unit 5.

In FIG. 6, numerals 1211, 1212, 1213, 1214, 1215, 1216 show a mark sheet sensing pattern, and numeral 1220 shows a document information display column. The document information display column includes document ID, document name, document number, date finally accessed to the document, renewal date when the document is renewed and re-recorded, the number of images contained in the document, paper size used to print the image of the document and the like which are printed in the column. Keywords such as the document name, document number, and the like may be registered when an image is recorded or after it is recorded. Numeral 1221 shows a column for setting whether a searched document is automatically printed or not after it is searched for by a search sheet, numeral 1222 shows a mark column for designating that automatic print is executed and numeral 1223 shows a mark column for designating that automatic print is not executed. When marking is omitted, automatic print is set as default. The set default can be changed and it may be changed in the unit of the storage medium 521 or in the unit of document. When marking is made to the column 1223, only search is executed. Numeral 1224 shows a column for document name by image and numeral 1225 shows a column in which a hand-written image document name is printed. The hand-written image document name may be registered when an image is recorded or after it is recorded. Numeral 1226 shows a column to which the reduced image of a document recorded to the optical magnetic disk is printed and numeral 1227 shows that the reduced image in the column 1227 is page 1 of a total of 6 pages. Numeral 1228 shows the paper size of the recorded image data. Numeral 1229 shows the resolution of the recorded image data. Although FIG. 6 shows an example that the page 1 of the recorded images is printed, the reduced images of a plurality of pages may be printed on a single search sheet. Numeral 1230 shows the disk name of the storage medium 521 and numeral 1231 shows the date and time when a search sheet is output. Numeral 1232 shows an image code to which information for specifying the type of search sheet, disk name and document name, and the like are printed.

Figure 7:
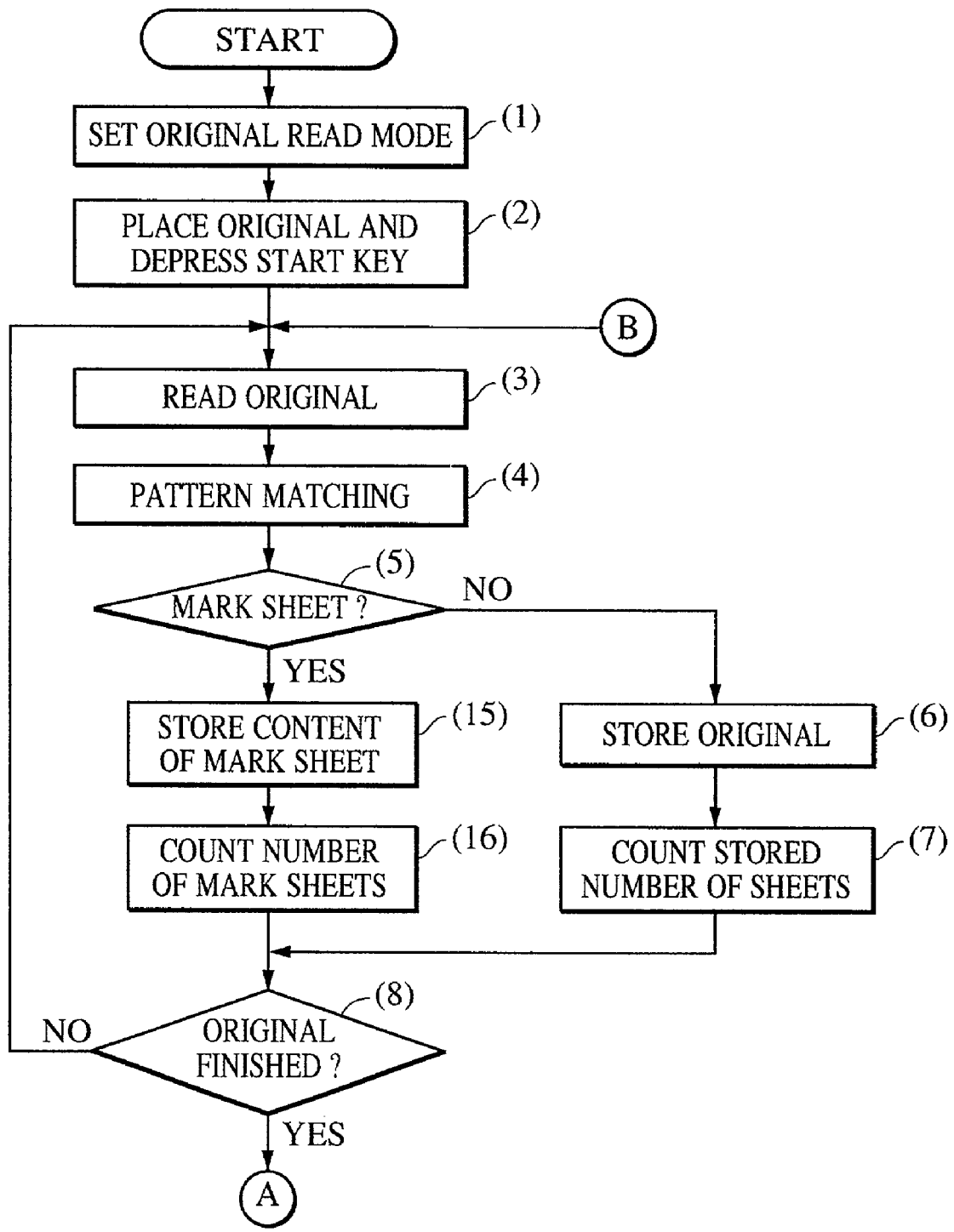
FIG. 7 is a flowchart showing a record/search processing of an image.
Figure 8:
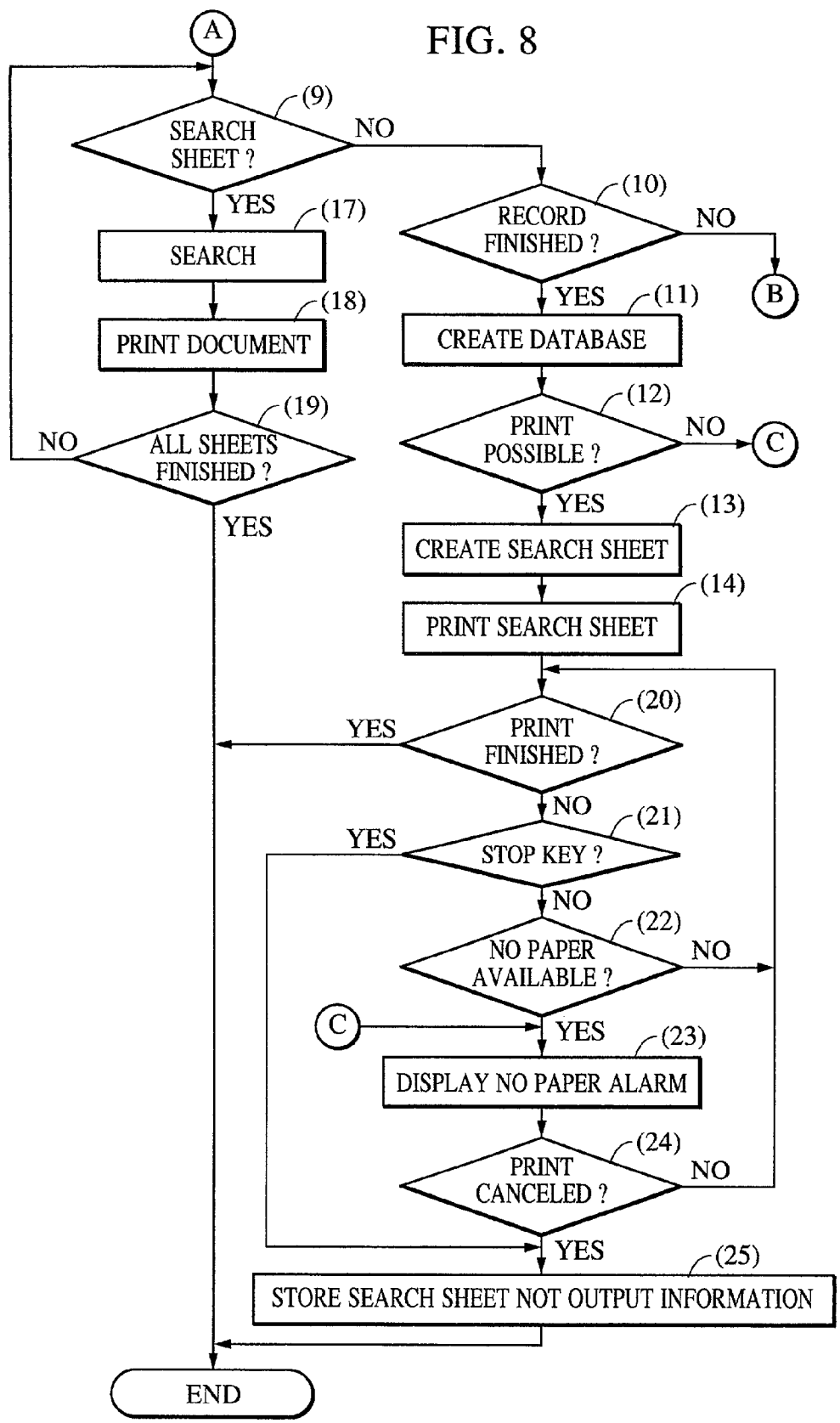
FIG. 8 is a flowchart showing a record/search processing of an image.

FIG. 7 and FIG. 8 are flowcharts showing an example of the procedure of an image I/O device according to the present invention. Note, numerals (1)-(25) in the drawings show respective steps.

Figure 9:
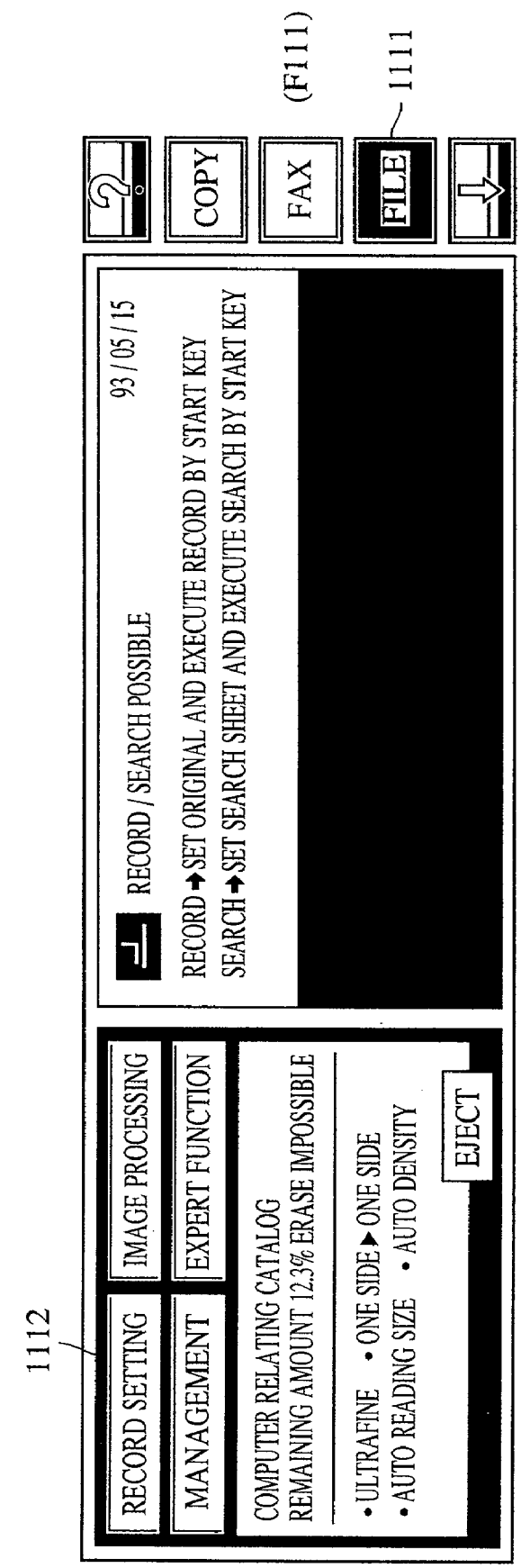
FIG. 9 is a view showing an operation screen.

First, when the storage medium 521 is inserted into the external storing unit 6 and the file key 1111 of the operation unit 115 (touch panel display) shown in FIG. 9 is depressed, an operation screen is switched to a file function as shown by Fill so that an image can be recorded/searched.

Figure 10:
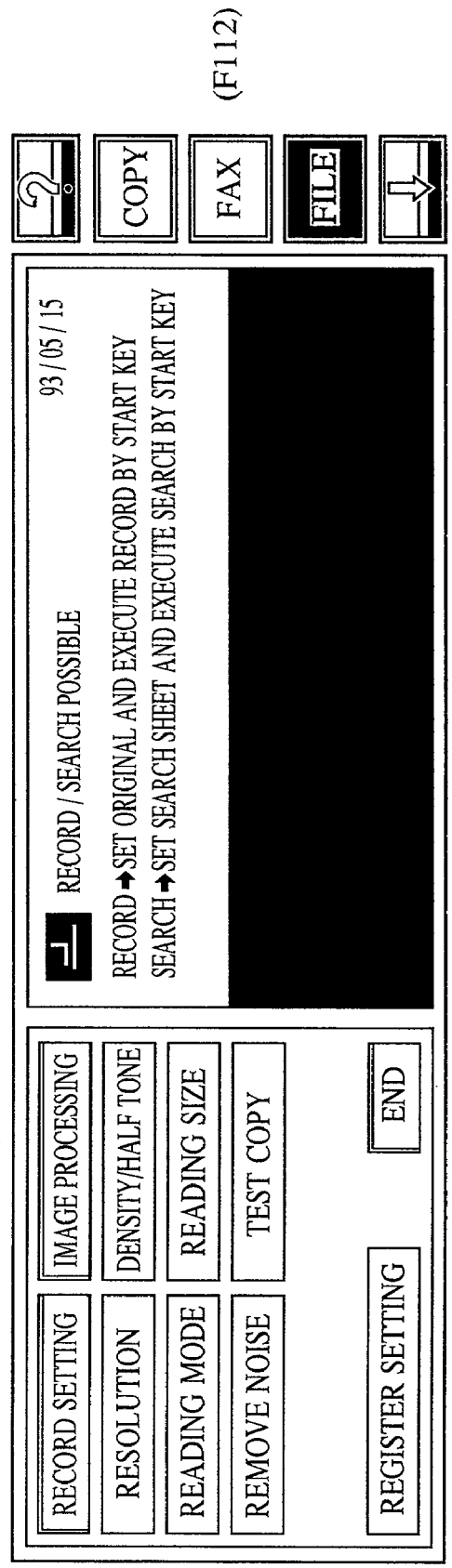
FIG. 10 is a view showing an operation screen.

An original reading mode is set at step 1. When a record setting key 1112 is depressed in the original reading mode, the operation screen (F112) shown in FIG. 10 is displayed so that various reading modes such as a reading mode (original on a screen), noise removal, density, half-tone, reading size and the like can be set. Note, reading may be executed by a reading mode set to default by omitting step 1.

Next, at step 2, when a bundle of originals is placed on the original feeder 101 of the reader unit 1 and the start key (not shown) of the operation unit 115 is depressed, the process goes to the next step 3.

Figure 11:
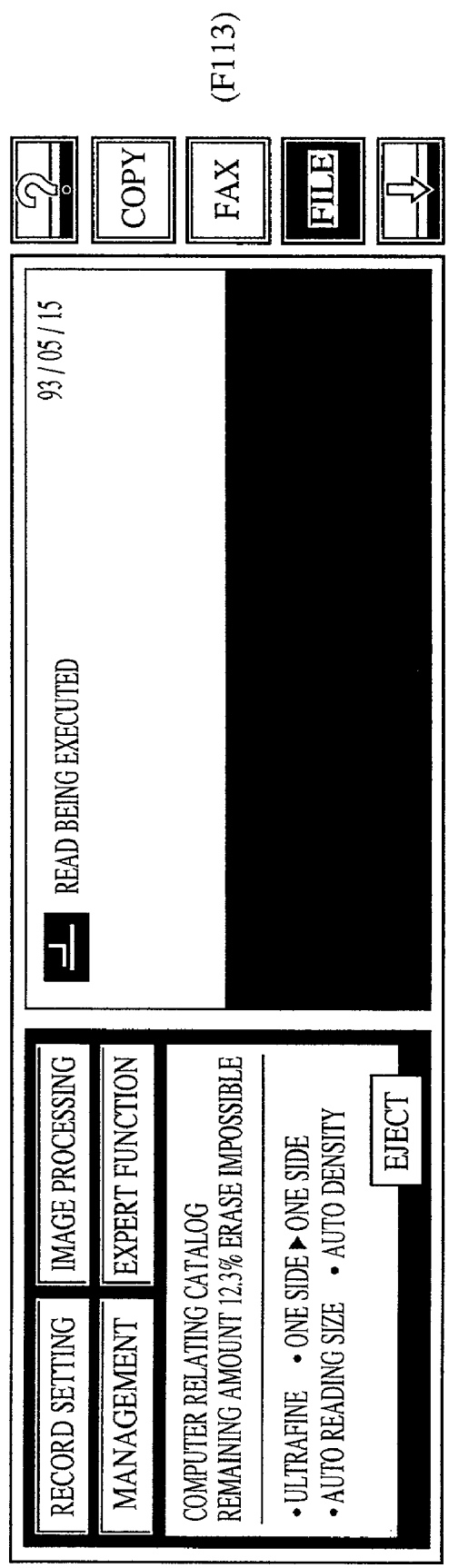
FIG. 11 is a view showing an operation screen.

At step 3, the operation screen is switched to F113 shown in FIG. 11 and the originals placed on the original feeder 101 of the reader unit 1 are transferred onto the platen glass 102 one by one and image information read by the reader unit 1 is stored to the memory A506 of the file unit 5 according to the flow of the aforesaid signal. At the time, the result sensed by the original size sensing photosensor (not shown) of the reader unit 1 is also supplied to the file unit 5.

At step 4, the CPU 516 analyzes the image data stored to the memory A506 and discriminates whether the sheet read by pattern matching is a mark sheet or not.

First, the CPU 516 examines whether the pattern 1211, the pattern 1212, the pattern 1213, the pattern 1214, the pattern 1215 and the pattern 1216 shown in FIG. 6 exist at the predetermined location of an image stored to the memory A506. Next, the respective examined patterns are compared with model patterns prepared previously and it is determined whether the image data stored to the memory A506 is the mark sheet or not based on the result of the comparison. When an image data is the predetermined mark sheet, the image code 1232 and the respective columns 1222 and 1223 in the automatic print setting column 1221 after the search is executed are read as information written on the mark sheet. The locations of the information are obtained from coordinates offset from a previously prescribed reference locations on the mark sheet. Whether a mark is written to the mark column or not may be determined in such a manner, for example, that the number of black pixels in the mark column 1223 is counted to thereby determine whether the number of the black pixels exceed a predetermined threshold value.

Next, when the result at step 4 indicates a predetermined mark sheet (search sheet) at step 4, the process goes to step 14, whereas when it is not the predetermined mark sheet, that is, when it is an ordinary original, the process goes to step 6.

Figure 12:
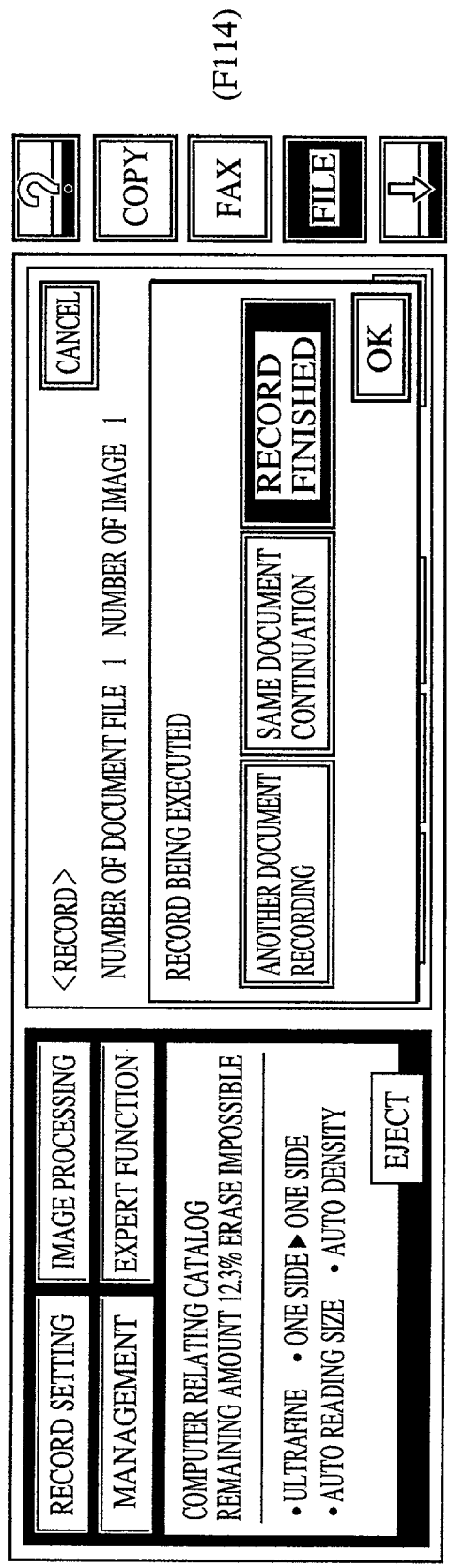
FIG. 12 is a view showing an operation screen.

At step 6, the image of the original is recorded to the storage medium 521 according to the aforesaid procedure and the operation screen is switched to F114 shown in FIG. 12. On the completion of the record of the image data, the process goes to step 7 to count up the stored number of the image data and then the process goes to step 8.

At step 8, it is determined whether the bundle of the originals placed on the original feeder 101 is entirely processed or not. When there remain unprocessed originals, the process goes to step 3, whereas when the bundle of the original is entirely processed, the process goes to step 9.

When the originals are processed at step 9, the process goes to step 10.

Figure 13:
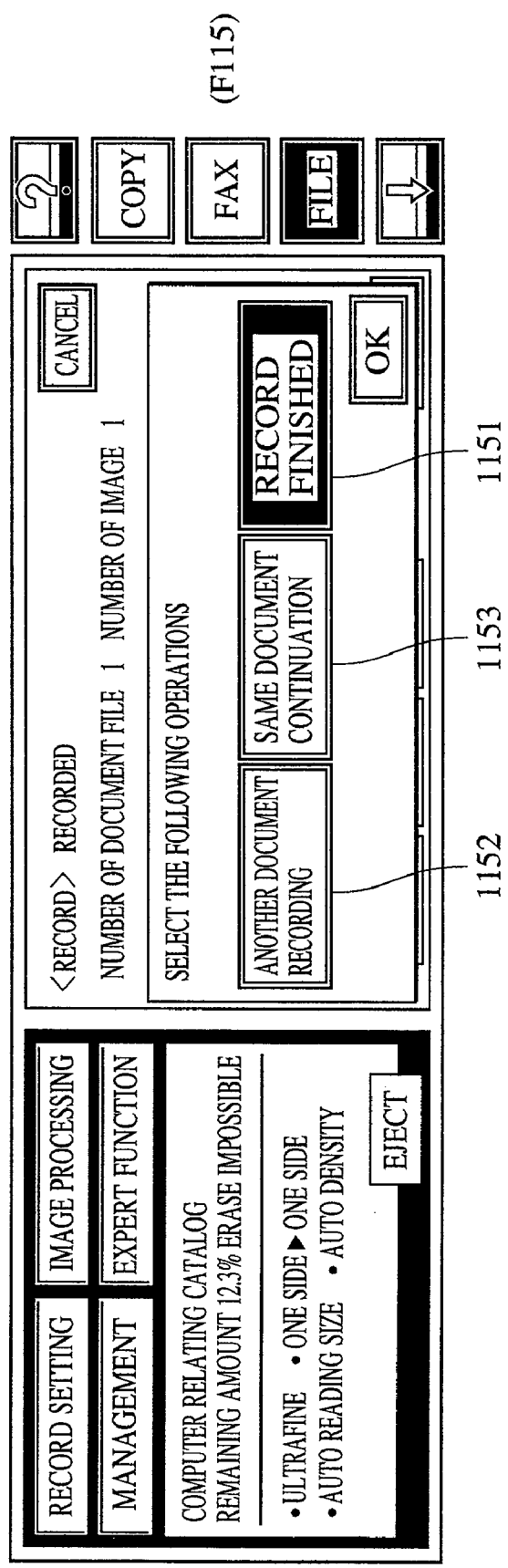
FIG. 13 is a view showing an operation screen.

At step 10, the operation screen is switched to F115 shown in FIG. 13 to permit the next processing to be selected. When a record end key 1151 is depressed in the operation screen, the process goes to step 11. Further, when the bundle of the originals on the original feeder 101 is replaced and an another document record key 1152 or a same document continuation key 1153 is depressed, the process goes to step 3. When the another document record key is depressed, original images are recorded to the optical magnetic disk as a document other the previous one at step 6, whereas when the same document continuation key is depressed, it is recorded as the same document as that recorded to the optical magnetic disk last time at step 6.

At step 11, various management information (for example, date of record, time of record, image data fetching mode and the like) is written to the management information recording region of the optical magnetic disk 521 to manage the recorded image data as an undivided document so that a database is created.

Figure 14:
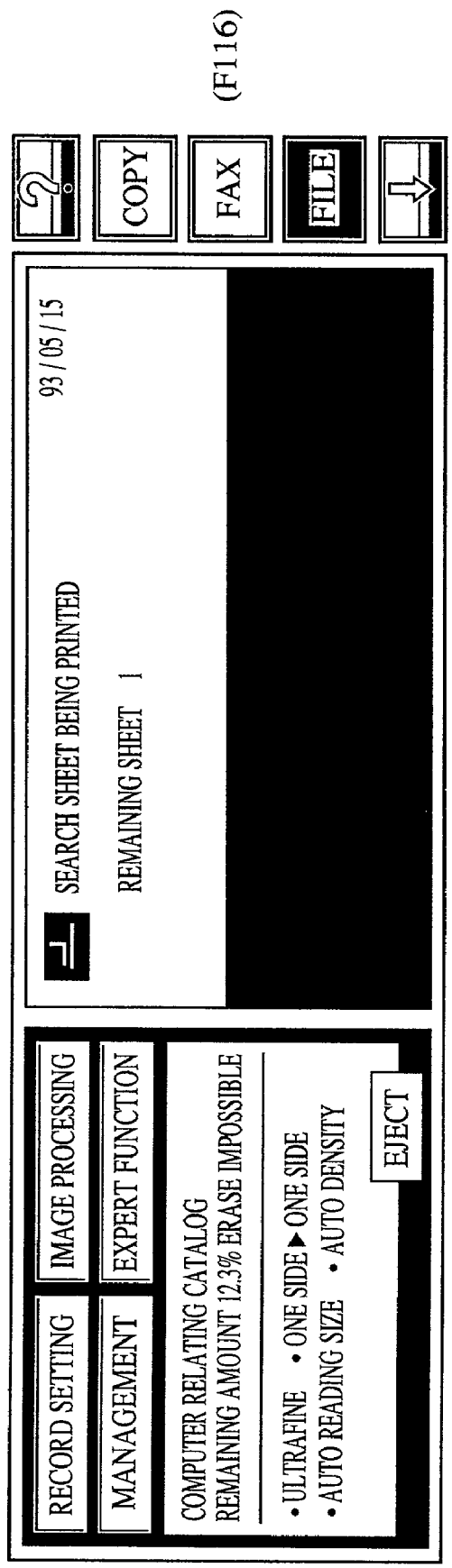
FIG. 14 is a view showing an operation screen.

At step 12, it is determined whether the printer unit 2 is in a print possible state or not and when it is in the print possible state, the operation screen is switched to F116 shown in FIG. 14 at step 13 and the image of the search sheet shown in FIG. 6, to which the reduced image of page 1 of the recorded document or the respective reduced images of page 1 to page 6 are recorded, is created to the memory D509. Whether only the reduced image of page 1 is recorded or the reduced images of page 1 to page 6 are recorded is predetermined by initial setting.

At step 12, when the printer unit 2 cannot execute print because no paper is available or the like, the process goes to step 23 without creating the image of the search sheet.

At step 14, the image of the search sheet created at step 13 starts to be output to the core unit 10 to be printed by the printer unit 2.

It is determined whether the print processing is finished or not at step 20. When the print processing is not finished, it is determined whether it is to be stopped by depressing a stop key or not at step 21. When the stop key is depressed, the process goes to step 25 and generates search sheet not output information showing that the search sheet is not yet printed to thereby save the search sheet to the optical magnetic disk and stop the print processing of the search sheet.

Figure 15:
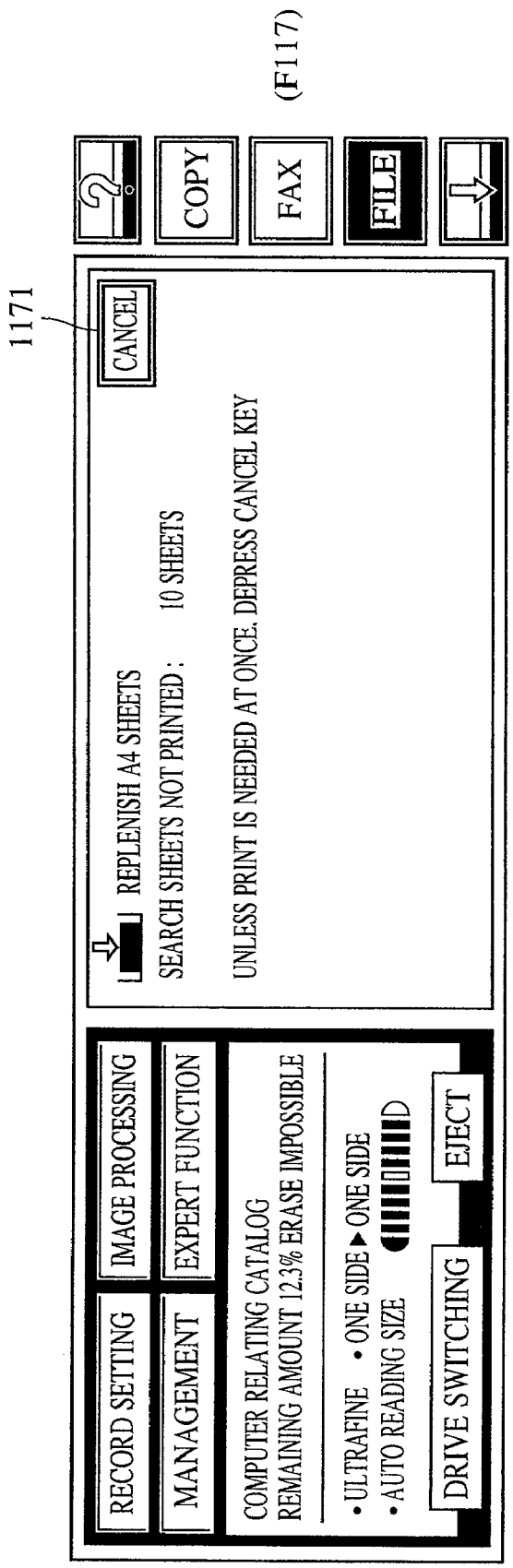
FIG. 15 is a view showing an operation screen.

Whether output papers are available in the printer unit 2 or not is determined again at step 22 and when no output paper is available, the process goes to step 23. At step 23, the operation screen is switched to F117 shown in FIG. 15 to display alarm. At this time, the number of not printed search sheets is displayed. When papers are fed while the alarm is displayed, the process goes to step 14 to switch the operation screen to F116 shown in FIG. 14.

When a cancel key 1171 is depressed in the operation screen F117 at step 24, the created image data of the search sheet is made ineffective and deta indicating that the search sheet is not yet output is stored and the search sheet print processing is interrupted at step 25.

When the processing is normally finished, the operation screen is returned to the standard screen (F111) shown in FIG. 9.

Figure 16:
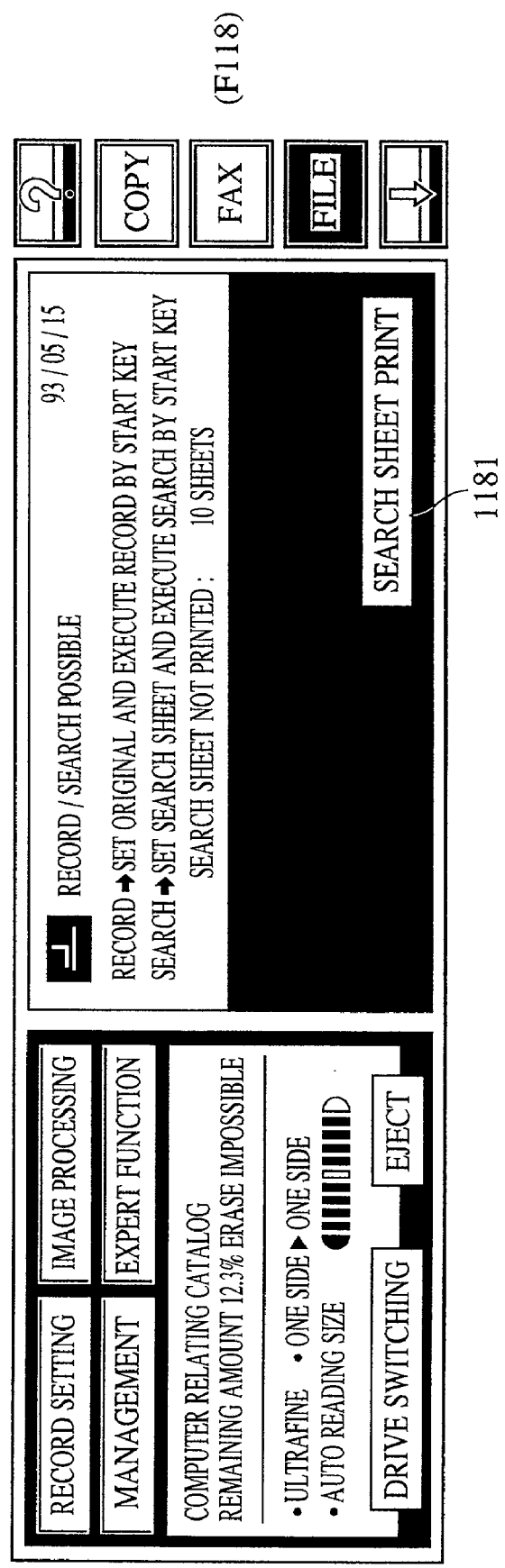
FIG. 16 is a view showing an operation screen.

When there are not yet printed search sheets, the user is notified by displaying that not yet printed search sheets exist at the search sheet output key ("search sheet print" key 1181) of the touch panel display in the standard screen (F118) shown in FIG. 16 and at the same time the number of the not printed search sheets is also displayed. Note, the search sheet print key 1181 of the touch panel display is erased when the print of the not output search sheets is finished.

When the search sheet print key 1181 is depressed, the process goes to step 14. When the search sheets are printed by depressing the key 1181, the aforesaid search sheet not output information is erased on the completion of the print.

Figure 17:
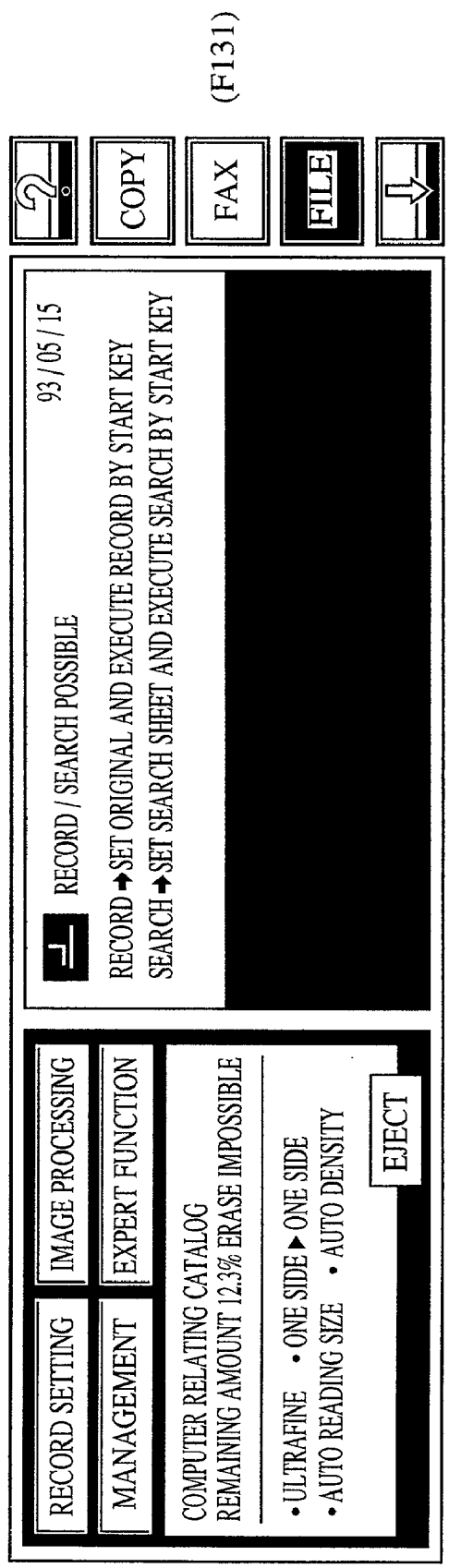
FIG. 17 is a view showing an operation screen.
Figure 18:
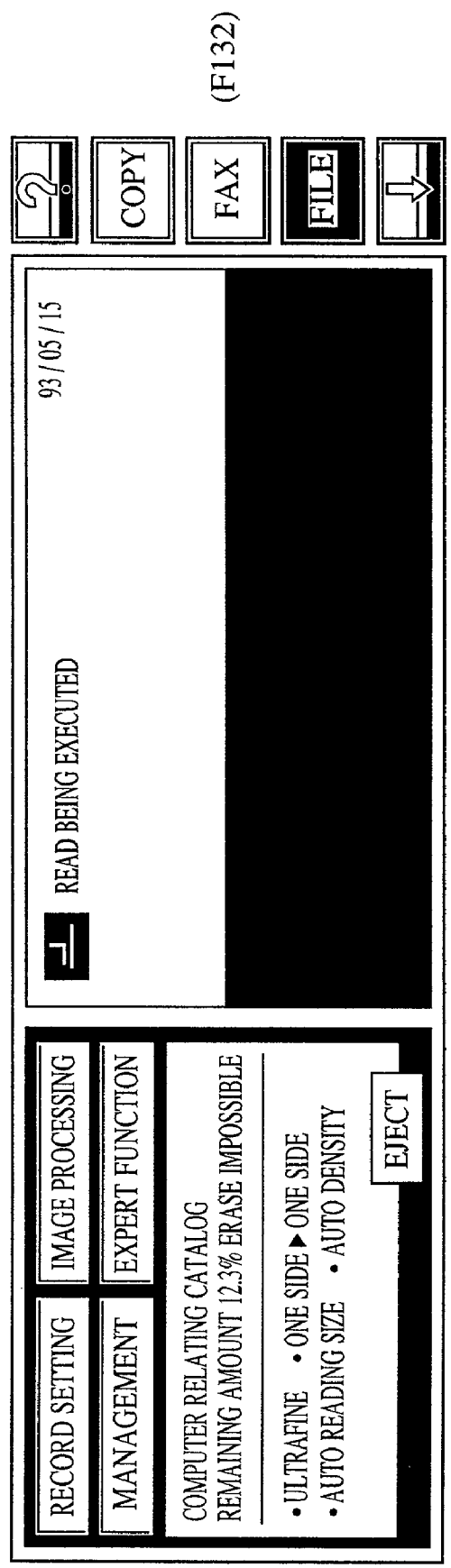
FIG. 18 is a view showing an operation screen.

When it is recognized at step 5 that the read sheet is the mark sheet (search sheet), the operation screen is switched to F133 shown in FIG. 17 and the process goes to step 15.

At step 15, the CPU 516 determines the image code 1232 of the read search sheet 1201 and the marking state of the setting column 1221 and stores them temporarily and then the process goes to step 16.

The number of the read mark sheets is counted up at step 16.

It is determined whether all the search sheets placed on the original feeder 101 are processed or not at step 8. When there remain unprocessed search sheets, the process goes to step 3, whereas when all the search sheets are processed, the process goes to step 9.

When the search sheets are processed at step 9, the process goes to step 17.

Figure 19:
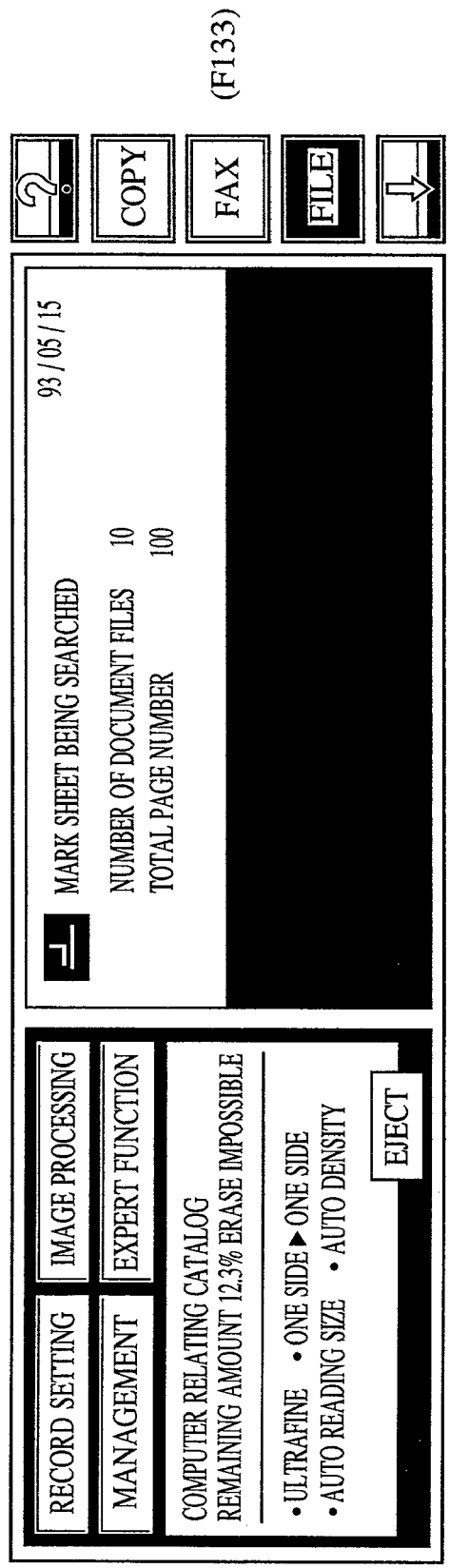
FIG. 19 is a view showing an operation screen.

At step 17, after the search-sheets are read, a search processing is executed while sequentially referring to the document database from the optical magnetic disk 521 according to the image code 1232 of the search sheet 1201 and the marking state of the setting column 1221 which are temporarily stored by the CPU 516. The total number of documents and the total number of pages obtained as the result of the search are displayed on the operation screen (F133) shown in FIG. 19. A case in which the execution of automatic print is selected after search will be described here.

Figure 20:
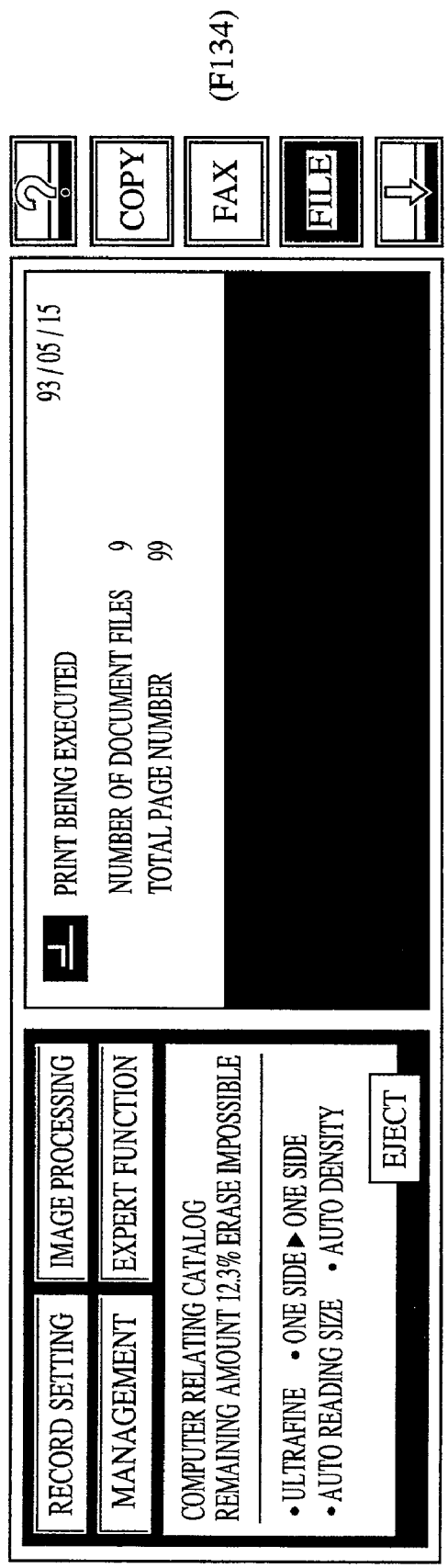
FIG. 20 is a view showing an operation screen.

The image data of the searched for documents is read for each document from the optical magnetic disk 521 at step 18 and the image data is output to the printer unit 2 according to the aforesaid procedure and the process goes to step 19. The operation screen is changed as shown by F134 of FIG. 20 while the print is being executed.

It is determined whether all the read search sheets are processed or not at step 19. When not all the sheets have been processed, the process goes to step 9, whereas when all the sheets are processed, the steps are ended.

Note, the search sheets may be read and the documents may be printed after search according to the reading sequence of the search sheets or a sequence opposite to the above reading sequence.

Figure 21:
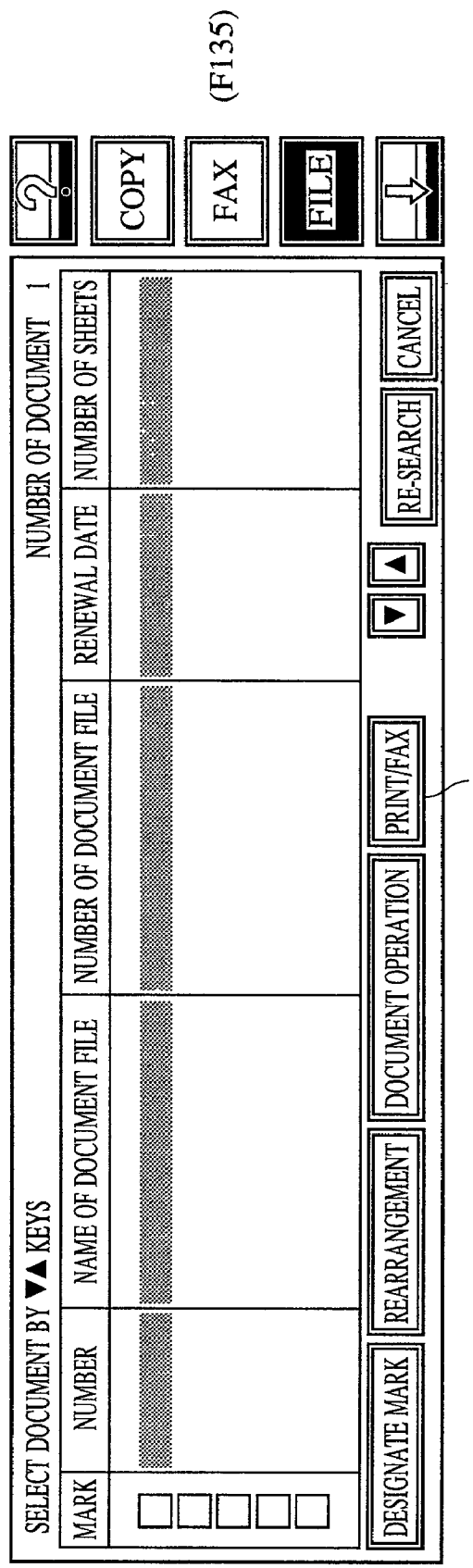
FIG. 21 is a view showing an operation screen.

Further, when it is selected that the automatic print is not executed after search, the operation screen is switched to F135 shown in FIG. 21 after the search is executed at step 17 and the searched for documents are displayed in a list.

Figure 22:
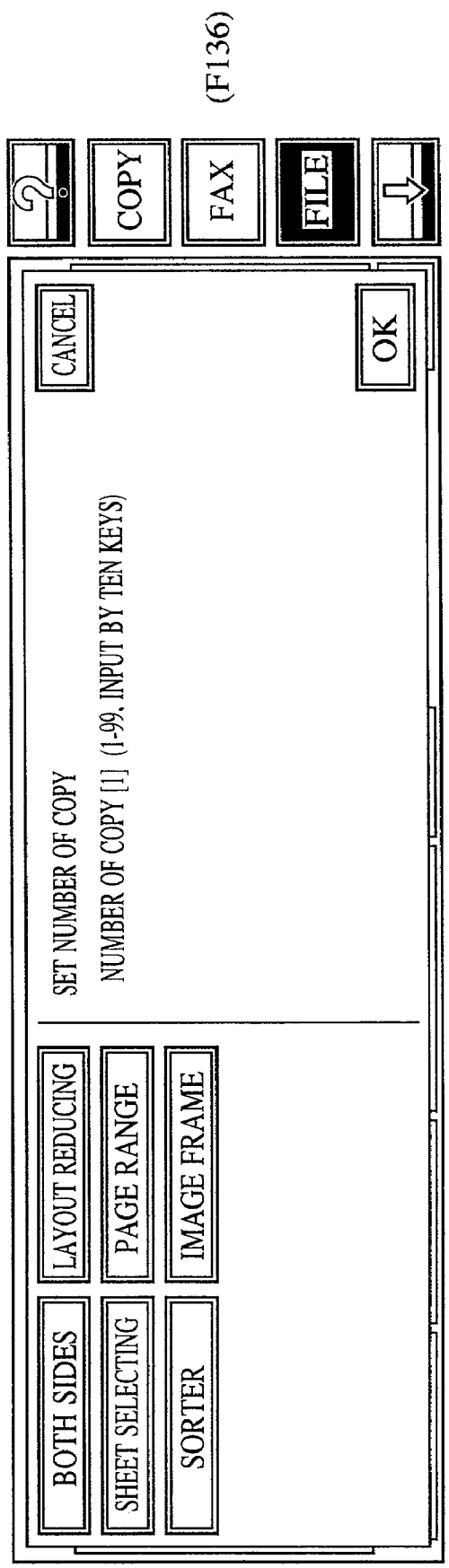
FIG. 22 is a view showing an operation screen.

When it is selected that the automatic print is executed after the search, the print setting is such that the number of prints is one and the print is executed to one side of a paper. However, when it is selected not to execute the automatic print, the operation screen is switched to F136 shown in FIG. 22 by depressing a print/fax key 1351 after the list is displayed so as to permit various settings such as both sides, selection of sheet, sorter and the like. Further, FAX transmission can be set by the facsimile unit 4 likewise.

Although a case has been described in which recording is executed using the original feeder 101, when the recording is executed by directly placing originals on the platen glass 102 without using the original feeder 101, recording can be also executed likewise only by handling a bundle of originals as a single sheet.

Further, even if the printer unit 2 is not in the print possible state, it is possible that the image of a search sheet is created and stored to the memory 124 of the core unit 10, the memories A-D of the file unit 5 or the optical magnetic disk and when the printer unit 2 is enabled, the image of the search sheet is output to the printer unit 2 to thereby automatically print the search sheet.

The present invention is not limited to the aforesaid embodiment but may be variously modified within the scope shown by claims.

What is claimed is:

1. An image filing apparatus for printing a search sheet used to search for a document file, stored in a storage medium by a printer, after the document file is stored in the storage medium, said apparatus comprising:

determination means for determining whether or not the printer is in a print-possible state when the search sheet is to be printed;

designation means for allowing, manually, a designation concerning a cancellation of a print processing of the search sheet when said determination means determines that the printer is not in the print-possible state; and control means for causing the printer to cancel the print processing of the search sheet for the stored document file and causing the storage medium to store data indicating that the search sheet was not printed, in accordance with the cancellation being designated by said designation means.

2. An image filing apparatus according to claim 1, further comprising display means for displaying that the search sheet was not printed.

3. An image filing apparatus according to claim 2, wherein said display means displays a number of search sheets that were not printed.

4. An image filing apparatus according to claim 2, wherein the storage medium is attachable to and detachable from said image filing apparatus, and said display means displays that a search sheet was not printed in response to attachment of the storage medium in which data is stored in said image filing apparatus.

5. An image filing apparatus according to claim 1, further comprising input means for inputting an indication for causing the search sheet that was not printed to be printed, wherein, in response to an input from said input means, said control means forms an image of the search sheet that was not printed and outputs the image to the printer.

6. A control method of an image filing apparatus for printing a search sheet used to search for a document file stored in a storage medium by a printer, after the document file is stored in the storage medium, said method comprising:

a first determination step, of determining whether or not the printer is in a print-possible state when the search sheet is to be printed;

a second determination step, of allowing, manually, an input of an indication concerning a cancellation of a print processing of the search sheet when it is determined in said first determination step that the printer is not in a print-possible state; and an interruption control step, of causing the printer to interrupt the print processing of the search sheet for the stored document file and causing the storage medium to save data indicating that the print processing of the search sheet was interrupted, in accordance with the input of the indication concerning the cancellation in said second determination step.

7. A control method of an image filing apparatus according to claim 6, further comprising a display step, of displaying that the search sheet was not printed.

8. A control method of an image filing apparatus according to claim 7, wherein a number of search sheets that were not printed is displayed in said display step.

9. A control method of an image filing apparatus according to claim 7, wherein the storage medium is attachable to and detachable from the image filing apparatus, and said display step displays that a search sheet was not printed in response to attachment of the storage medium in which data is stored in the image filing apparatus.

10. A control method of an image filing apparatus according to claim 6, further comprising a third determination step, of determining whether or not an indication for causing the search sheet that was not printed to be printed is inputted, and an output step, of forming an image of the search sheet that was not printed and outputting the image to the printer when it is determined in said third determination step that the print indication is inputted.

11. An image filing apparatus for printing a search sheet used to search for a document file, stored to a storage medium by a printer, after the document file is stored in the storage medium, said apparatus comprising:

determination means for determining whether or not the printer is in a print-possible state when the search sheet is to be printed;

cancellation control means for causing the printer to cancel a print processing of the search sheet for the stored document file and causing the storage medium to store data indicating that the search sheet was not printed, when said determination means determines that the printer is not in the print-possible state; and key input control means for causing a display unit to perform a display of a search sheet print key to input an indication for printing the search sheet that was not printed when the printer is next placed in the print-possible state after the print processing of the search sheet is cancelled by said cancellation control means.

12. An image filing apparatus according to claim 11, wherein said key input control means causes erasure of the search sheet print key displayed on the display unit in response to completion of the print processing of the search sheet that was not printed.

13. A control method of an image filing apparatus according to claim 11, wherein the storage medium is attachable to and detachable from the image filing apparatus, and the key input control means causes display of the search sheet print key in response to attachment of the storage medium in which the document file of the search sheet that was not printed is stored in the image filing apparatus.

14. A control method of an image filing apparatus for printing a search sheet used to search for a document file, stored in a storage medium by a printer, after the document file is stored, said method comprising:

a first determination step, of determining whether or not the printer is in a print-possible state when the search sheet is to be printed;

a cancellation control step, of causing the printer to cancel a print processing of the search sheet for the stored document file and causing the storage medium to store data indicating that the search sheet was not printed, when it is determined in said first determination step that the printer is not in the print-possible state; and a key input control step, of causing a display unit to perform a display of a search sheet print key to input an indication for printing the search sheet that was not printed, when the printer is next placed in the print-possible state after the print processing of the search sheet is cancelled in said cancellation control step.

15. A control method of an image filing apparatus according to claim 14, wherein the search sheet print key displayed on the display unit is erased in response to the completion of the print processing of the search sheet that was not printed in said key input control step.

16. A control method of an image filing apparatus according to claim 14, wherein the storage medium is attachable to and detachable from the image filing apparatus, and said key input control step causes display of the search sheet print key in response to attachment of the storage medium in which the document file is stored in the image filing apparatus.

17. An image filing apparatus for printing a search sheet of a plurality of search sheets used to search for a document file of a plurality of document files, stored in a storage medium by a printer, after the document file is stored in the storage medium, said apparatus comprising:

determination means for determining whether or not the printer is in a print-possible state when a search sheet of the plurality of search sheets is to be printed;

cancellation control means for causing the printer to cancel a print processing of the search sheet for the stored document file, when said determination means determines that the printer is not in the print-possible state; and display control means for causing a display unit to perform a display of a number of search sheets of the plurality of search sheets corresponding to stored document files that were not printed, when the print processing of the search sheets is cancelled by said cancellation control means.

18. An image filing apparatus according to claim 17, wherein the storage medium is attachable to an detachable from the image filing apparatus, and the display control means causes a display indicating that there is a search sheet that was not printed in response to attachment of the storage medium in which the document file of the search sheet that was not printed is stored in said image filing apparatus.

19. A control method of an image filing apparatus for printing a search sheet of a plurality of search sheets used to search for a document file of a plurality of document files, stored to a storage medium by a printer, after the document file is stored in the storage medium, said method comprising:

a first determination step, of determining whether or not the printer is in a print-possible state when a search sheet of the plurality of search sheets is to be printed;

a cancellation control step, of causing the printer to cancel a print processing of the search sheet for the stored document file, when said first determination step determines that the printer is not in the print-possible state; and a display control step, of causing a display unit to perform a display of a number of search sheets of the plurality of search sheets corresponding to the stored document files, that were not printed, when the print processing of the search sheets has been cancelled in said cancellation control step.

20. A control method of an image filing apparatus according to claim 19, wherein the storage medium is attachable to and detachable from the image filing apparatus, and said display control step causes a display indicating that there is a search sheet that was not printed in response to attachment of the storage medium in which the document file of the search sheet that was not printed is stored in the image filing apparatus.

* * * * *